United States Patent
Babb et al.

(10) Patent No.: US 10,964,155 B2
(45) Date of Patent: Mar. 30, 2021

(54) TECHNIQUES AND APPARATUSES FOR PROVIDING BLENDED GRAPHICAL CONTENT FOR GAMING APPLICATIONS USING A SINGLE GRAPHICS CONTEXT AND MULTIPLE APPLICATION PROGRAMMING INTERFACES

(71) Applicant: Aristocrat Technologies Australia Pty Limited, North Ryde (AU)

(72) Inventors: Derrick Tobias Babb, Austin, TX (US); John David Stanhope, Austin, TX (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 61 days.

(21) Appl. No.: 16/383,435

(22) Filed: Apr. 12, 2019

(65) Prior Publication Data

US 2020/0327772 A1 Oct. 15, 2020

(51) Int. Cl.
*G07F 17/32* (2006.01)
*G06T 11/60* (2006.01)
(Continued)

(52) U.S. Cl.
CPC .......... *G07F 17/3211* (2013.01); *G06F 9/547* (2013.01); *G06Q 30/0641* (2013.01);
(Continued)

(58) Field of Classification Search
None
See application file for complete search history.

(56) References Cited

U.S. PATENT DOCUMENTS

| 7,070,501 | B2 | 7/2006 | Cormack |
| D624,927 | S | 10/2010 | Allen |

(Continued)

FOREIGN PATENT DOCUMENTS

| AU | 2013202658 | 1/2014 |
| AU | 2013251288 A1 | 5/2014 |

(Continued)

OTHER PUBLICATIONS

Australian Examination Report for Application No. 2018278882, dated Dec. 9, 2019, 2 pages.
(Continued)

*Primary Examiner* — James S. McClellan
*Assistant Examiner* — Peter J Iannuzzi
(74) *Attorney, Agent, or Firm* — Weaver Austin Villeneuve & Sampson LLP

(57) ABSTRACT

Techniques and apparatuses are provided for allowing simultaneous presentation, via a single graphics context, of graphical content originating through the execution of two programs that produce graphics-related commands using two different application programming interfaces (APIs). For example, a game host engine may produce commands using a first API and may cause a graphics context for the first API to be created. Game application code that causes commands using a second API to be created may be executed as well, in addition to an emulation layer that may translate the second API commands into equivalent first API commands. The emulation layer may then send the equivalent first API commands to the graphics context, resulting graphical content that originates from both the game application code using the second API and the game host engine using the first API to be blended together in the graphics context and then rendered to a display.

20 Claims, 6 Drawing Sheets

(51) Int. Cl.
*G06F 9/54* (2006.01)
*G06F 3/0482* (2013.01)
*G06Q 30/06* (2012.01)

(52) U.S. Cl.
CPC .......... *G06T 11/60* (2013.01); *G07F 17/3209* (2013.01); *G06F 3/0482* (2013.01)

(56) References Cited

U.S. PATENT DOCUMENTS

| | | |
|---|---|---|
| D648,347 S | 11/2011 | Chaudhri |
| 8,360,851 B2 | 1/2013 | Aoki |
| 9,424,720 B2 | 8/2016 | Suda |
| 9,928,691 B2 | 3/2018 | Olive |
| D824,932 S | 8/2018 | Joensson |
| D834,596 S | 11/2018 | Bae |
| 2003/0216165 A1 | 11/2003 | Singer |
| 2004/0137982 A1 | 7/2004 | Cuddy |
| 2006/0189369 A1 | 8/2006 | Taylor |
| 2007/0060248 A1 | 3/2007 | Rodgers |
| 2007/0129135 A1 | 6/2007 | Marks |
| 2009/0054129 A1 | 2/2009 | Yoshimura |
| 2009/0239634 A1 | 9/2009 | Nguyen |
| 2010/0075737 A1 | 3/2010 | Bluemel |
| 2010/0210343 A1 | 8/2010 | Englman |
| 2010/0234092 A1 | 9/2010 | Gomez |
| 2010/0281107 A1* | 11/2010 | Fallows .................. H04L 67/42 709/203 |
| 2011/0157196 A1* | 6/2011 | Nave .................... A63F 13/358 345/522 |
| 2012/0178517 A1 | 7/2012 | Montenegro |
| 2013/0331168 A1 | 12/2013 | Street |
| 2014/0080564 A1 | 3/2014 | Acres |
| 2014/0274292 A1 | 9/2014 | Suda |
| 2014/0323198 A1 | 10/2014 | Tuck |
| 2015/0310699 A1 | 10/2015 | Meyer |
| 2016/0042597 A1 | 2/2016 | Olive |
| 2016/0253873 A1 | 9/2016 | Olive |
| 2017/0032609 A1 | 2/2017 | Inamura |
| 2017/0148274 A1 | 5/2017 | Olive |
| 2017/0154498 A1 | 6/2017 | Olive |
| 2018/0001216 A1* | 1/2018 | Bruzzo .................. A63F 13/30 |
| 2018/0075708 A1 | 3/2018 | San |
| 2018/0268655 A1 | 9/2018 | Olive |
| 2020/0111312 A1 | 4/2020 | Olive |

FOREIGN PATENT DOCUMENTS

| | | |
|---|---|---|
| AU | 2014202042 A1 | 5/2014 |
| EP | 0984408 | 3/2000 |

OTHER PUBLICATIONS

Australian Examination Report for AU2016100230, dated May 11, 2016, 5 pages.
Australian Examination Report for AU2015210489, dated Jun. 14, 2016, 5 pages.
Australian Examination Report for AU2016202727, dated Jul. 4, 2016, 5 pages.
Australian Examination Report for AU2017101097, dated Dec. 7, 2017. (3 pages).
Australian Examination Report for AU2017101629, dated Jan. 16, 2018, 3 pages.
Australian Examination Report for AU2017204560, dated Feb. 1, 2018, 3 pages.
Australian Examination Report for Application No. 2018241080, dated Sep. 24, 2019.
U.S. Appl. No. 16/455,166, filed Jun. 27, 2019, System and Method for Providing a Feature Game.
Australian Examination Report for Application No. 2019200719, dated Apr. 8, 2020, 3 pages.
Office Action dated Jun. 4, 2020 for U.S. Appl. No. 29/622,662 (pp. 1-8).
Office Action dated Jun. 25, 2020 for U.S. Appl. No. 16/537,223 (pp. 1-11).
Notice of Allowance dated Aug. 31, 2020 for U.S. Appl. 29/622,662 (pp. 1-7).

* cited by examiner

TECHNIQUES AND APPARATUSES FOR PROVIDING BLENDED GRAPHICAL CONTENT FOR GAMING APPLICATIONS USING A SINGLE GRAPHICS CONTEXT AND MULTIPLE APPLICATION PROGRAMMING INTERFACES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to cash out.

Slot type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a pay-table which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG), e.g., a pseudorandom number generator, to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

The present disclosure is directed at computing devices or systems, as well as methods of using such devices or systems or computer-readable media storing computer-executable instructions for controlling such computer devices or systems that are, at a high level, configured to blend graphical content from two different executing programs within the same window for the purposes of presenting a gaming experience. Such computing devices may be particularly well-suited for providing a lobby-based system in which a user may choose any of a large number of games for play. Lobby-related content and the game content in such systems may be blended together into a seamless presentation via the systems and techniques discussed herein, even when provided by different executing programs using different graphics language application programming interfaces. Such implementations may have particular relevance to scenarios in which the computing device or system is a smartphone or tablet computer.

For example, graphics from two different APIs, e.g., OpenGL and WebGL, may be blended together in a single graphics context by converting commands from one API into commands for the other API using an emulation layer, thereby allowing an application using the first API to generate lobby GUI content that is blended with game content provided by software using the other API into a single graphics presentation. In some instances, the game code may be provided in an interpreted language, allowing the game code to be distributed without passing through an App Store, e.g., the Apple App Store or Google Play.

In general, the lobby-related content may be provided through a game host engine that is configured to execute pre-compiled, computer-executable code that is stored on a computing device; such pre-compiled code is stored in its pre-compiled state on one or more storage devices of the computing device and then loaded into memory and executed by the operating system of such a device to provide the game host engine. The game host engine may act as an overall framework, also referred to herein as a "lobby," that allows a player to select various games to be played and may, in some implementations, include other functionality, e.g., the ability to control the audio volume of the lobby and/or games offered for play, the ability to use social networking and/or messaging features, access to leaderboards, access to player account information, and so on. Such features may generally be independent of the particular game, if any, being played, and may thus be offered by the game host engine regardless of which game or games are selected for play by the user.

The game host engine may have several modes of operation that may manifest in different GUI presentations of the lobby. When the game host engine is actively being interacted with, e.g., when no game is actually executing, when an executing game is paused, or when a game selection interface of the lobby is being presented, then the GUI that is presented for the lobby may, for example, occupy a significant portion (or all) of the available display area of the graphics window used by the game host engine. When the game host engine is not actively being interacted with, or interacted with in a less active manner, the GUI presentation of the lobby may be much more constrained, e.g., showing perhaps a limited GUI interface along one edge of the graphics window used by the game host engine, or perhaps showing only a few button controls that may be activated to cause a larger, more fully-featured GUI for the lobby to be activated.

The game host engine may cause a graphics context for a first application programming interface (API), such as OpenGL®, Metal®, Vulkan®, etc., to be generated and may send commands using the first API to the graphics context in order to cause the graphics context to store data describing one or more graphics objects. Such data describing one or more graphics objects may then be provided to a renderer that may render one or more scenes to a display window in order to display graphics for the lobby. The game host engine, in creating the graphics context, will obtain context information that identifies that graphics context, which allows the game host engine to ensure that the graphics-related commands that it sends are sent to the graphics context that it created (rather than a graphics context that another program may have created).

When a game has been selected for play by a player via the game host engine GUI, the game host engine may obtain game code therefore and cause computer-executable instructions therein for controlling the one or more processors to be executed to provide the selected game on the computing device. Under the architecture described herein, the graphical content for the selected game may be blended with the graphical content for the lobby provided by the game host engine for a single, unified presentation in a display window. The architecture discussed herein not only allows for such blended graphical content to be provided, but also facilitates the provisioning of computer-executable instructions for providing game content via an interpreted language, e.g., via JavaScript™, TypeScript, etc., if desired.

Generally speaking, computer languages may be separated into two broad classes based on how they are implemented—compiled or pre-compiled computer languages are, prior to being stored in non-volatile storage of a computing device, compiled from a higher-level language, e.g., source code, into a lower-level language, e.g., assembly, object code, or machine code, to create an executable program. Such lower-level languages are generally operating-system specific, and it is thus usually not possible to execute computer code that has been compiled for one general class of operating systems on operating systems of a completely different class (for example, computer code compiled for the Windows® operating system may be executable on some or all versions of Windows®, but would not be executable in an operating system like Linux® or iOS®). Moreover, compiled computer languages, once compiled, may simply be copied into memory and executed by an operating system; no further preparation of the computer instructions need be performed.

Interpreted computer languages, in contrast, are generally stored in a higher-level format, e.g., as source code, that is then interpreted, at least to some degree, at run-time by a language interpreter that transforms the source code into machine code, or similar lower-level language, and then causes such lower-level code to be executed by the one or more processors of the computing device providing the language interpreter. Interpreted languages may also be stored in an intermediate-level format, e.g., bytecode, which is no longer easily human-readable and has been formatted into a format that is more efficiently executed by an associated language interpreter but which is, itself, not executable by a computing device without further processing by a language interpreter designed to run within an operating system or another application that may be executed by that computing device.

Language interpreters are typically written for specific operating systems and/or host applications such that the same interpreted language commands produce the same or equivalent results when executed by any language interpreter for that interpreted language, regardless of what operating system and/or host application is associated with the language interpreter used to interpret the interpreted language commands.

Perhaps the most common use of language interpreters is in the context of web browsers, which frequently include one or more language interpreters that allow the web browser to execute interpreted language code that is delivered from a website. Since websites may be accessed by computing devices running any number of different operating systems and/or using different web browsers, the use of an interpreted language allows for the development of a single set of interpreted language computer code that may then be provided to any computing device accessing the web site and then executed by that computing device via an associated language interpreter that is specific to that particular computing device and/or the web browser used. Various popular interpreted languages include JavaScript™, Java™, TypeScript, C#, Lua™, Ruby, etc. There may be various language interpreters for each such interpreted language—for example, the Google Chrome™ web browser currently uses the V8 language interpreter for interpreting the JavaScript™ interpreted language, whereas the Microsoft Edge™ browser currently uses the Chakra language interpreter. Language interpreters may also be referred to herein as "engines," e.g., a JavaScript™ engine would be a language interpreter for interpreting and executing the JavaScript™ interpreted language.

Implementations that use an interpreted language to provide game code may allow the same interpreted language game code to be used to provide a gaming experience on any computing device with a language interpreter configured to interpret that interpreted language. This allows for a single, unified codebase to be maintained for a given game application. Since the game code will be generating three-dimensional graphical content, the interpreted language used may be for a language interpreter that offers support for an API. Common language interpreters suitable for such purposes may, for example, use the WebGL™ API.

Thus, the graphical content for the lobby may be provided by the game host engine, which may have created a graphics context using a first API, such as OpenGL®, and the graphical content for the game application may be provided by the game code using a second API, such as WebGL™. Such an architecture may also include an emulation layer that is configured to convert the commands sent using the second API into commands for the first API and to cause those converted commands to be sent to the graphics context that was created using the first API. Thus, the graphics context will receive commands that ultimately originate from two separate applications, the game application and the game host engine, and that were originally generated under two different APIs. The graphical content that is then rendered based on the graphics context will thus include graphics objects that originate from both the game application and the game host engine, thereby allowing for graphical content from the game application and the game host engine to be blended together in a single display window.

In the context of some devices, e.g., mobile devices, in particular, such an approach provides a significant benefit in addition to the unified codebase benefit discussed above. For example, mobile devices frequently have tightly controlled operating systems, e.g., "walled gardens," in which the ability to install software and programs is managed through a marketplace application on the device that serves as a gateway for downloading and installing such applications or programs. For example, devices running Apple® iOS®, unless specially configured, are forced to install software via the Apple® App Store®. Before a software application is made available for download and installation via the iTunes store, the developer of the software application must submit the software application to a review process managed by Apple®. During the review process, the software application may be tested and evaluated in various ways. This review process may generally take a week to ten days, and must generally be undertaken each time a new version of a software application is released. Google™'s Android™ operating system has a corresponding marketplace application called Google Play™ that operates in a similar manner, although the review process for Google Play™ is less stringent.

The present architecture may offer a way to bypass the delay associated with such a review process. For example, the game host engine application may be offered as an application that may be downloaded through a marketplace application and may therefore be subject to any review processes associated therewith. However, because some implementations of the game host engine may include a language interpreter for an interpreted language, such game host engines may, as part of their normal operation, download and execute interpreted language game code. Such game code would not need to be installed through the marketplace application and therefore not need to be listed in the marketplace application, thereby avoiding the delay normally associated with obtaining such a listing.

Some of the implementations that will be evident from the present disclosure are presented below, although the following implementations should not be construed as an exclusive list of such implementations, and additional implementations may be evident based on other portions of this disclosure.

In some implementations, a system is provided that includes one or more display devices, one or more processors, one or more memory devices, and one or more storage devices. In such implementations, the one or more display devices, the one or more processors, the one or more memory devices, and the one or more storage devices may be operably connected, and the one or more storage devices may store computer-executable instructions for controlling the one or more processors to: provide a game host engine, the game host engine configured to cause the one or more processors to cause a graphics context for a first application programming interface (API) to be created in the one or more memory devices, obtain context information that identifies the graphics context, and send one or more first commands to the graphics context using the context information and the first API, where the one or more first commands may be configured to modify the graphics context to include data defining one or more first graphics objects defining lobby content; obtain first game code representing a first game application, where the first game code includes one or more second commands for a second API and the second API may be different from the first API; execute the first game code; provide an emulation layer that may be configured to convert commands for the second API into commands for the first API; convert, using the emulation layer, the one or more second commands for the second API into one or more third commands for the first API; send the one or more third commands to the graphics context using the context information and the first API, where the one or more third commands may be configured to modify the graphics context to include data defining one or more second graphics objects representing gaming content; and cause graphical output to be rendered to at least one of the one or more display devices according to the one or more first graphics objects and the one or more second graphics objects included in the graphics context, thereby producing blended computer graphics from the game host engine and the first game application using the graphics context.

In some such implementations, the one or more storage devices may store further computer-executable instructions for controlling the one or more processors to provide a marketplace application that, when executed by the one or more processors, (a) causes the one or more processors to cause information to be retrieved via a network connection regarding a plurality of applications that may be downloadable to the system and (b) causes one or more selected applications from the plurality of applications to be downloaded to the system and installed on the one or more storage devices responsive to one or more inputs. In such implementations, the game host engine may be associated with information stored on the one or more storage devices indicating that the game host engine was installed on the system by the marketplace application, and the first game code is not associated with information stored on the one or more storage devices indicating that the first game code was installed on the system by the marketplace application.

In some implementations, the marketplace application may be associated with a set of one or more first Internet addresses which may be configured to provide the marketplace application with any of the applications of the plurality of applications responsive to one or more requests by the marketplace application, and the one or more storage devices may further store computer-executable instructions for controlling the one or more processors to obtain the first game code by downloading the first game code from an Internet address that is not in the set of one or more first Internet addresses.

In some implementations, the second API is WebGL™ and the first API is not WebGL™.

In some implementations, the system may be configured to execute the game host engine within a first operating system, the first game code may be in an interpreted programming language, the one or more storage devices may store further computer-executable instructions for controlling the one or more processors to cause a language interpreter for the interpreted programming language to be executed, the language interpreter may be configured to interpret and execute the first game code, the language interpreter may include a first set of computer-executable instructions that govern interpretation of a first set of one or more commands of the interpreted programming language and a second set of computer-executable instructions that govern interpretation of the first set of one or more commands of the interpreted programming language, the first set of computer-executable instructions may be different from the second set of computer-executable instructions, and the one or more storage devices may further store computer-executable instructions for controlling the one or more processors to: select, based on the first operating system, the first set of computer-executable instructions or the second set of computer-executable instructions to use as a selected set of computer-executable instructions, and execute the first game code via the language interpreter using, at least in part, the selected set of computer-executable instructions.

In some implementations, the language interpreter may include a common set of computer-executable instructions that govern interpretation of a second set of one or more commands of the interpreted programming language, the first set of one or more commands and the second set of one or more commands may not overlap, and the one or more storage devices may further store computer-executable instructions for controlling the one or more processors to execute the first game code via the language interpreter using the selected set of computer-executable instructions and the common set of computer-executable instructions.

In some implementations, the one or more storage devices may further store computer-executable instructions for controlling the one or more processors to select the first set of computer-executable instructions as the selected set of computer-executable instructions when the operating system used by the system may be Android™ and select the second set of computer-executable instructions as the selected set of computer-executable instructions when the operating system used by the system may be iOS®.

In some implementations, the first set of computer-executable instructions may govern interpretation and execution of the interpreted programming language based on Google V8 and the second set of computer-executable instructions may govern interpretation and execution of the interpreted programming language based on Webkit® JavaScriptCore.

In some implementations, the emulation layer may be configured to not cause any command to be sent to the graphics context that does not have a counterpart in the one or more second commands for the second API.

In some implementations, the one or more third commands, when executed by the hardware graphics rendering engine, may cause graphical content based on the one or more first graphics objects to be obscured, at least in part, by at least some graphical content based on the one or more second graphics objects only when the one or more third commands have counterparts in the one or more second commands for the second API.

In some implementations, the language interpreter may be configured to interpret and execute an interpreted programming language such as: JavaScript™, Java™, C#, TypeScript, Ruby, and Lua.

In some implementations, the game host engine may be provided using the Unity game engine and the language interpreter may be a low-level Unity plugin.

In some implementations, the first API may be OpenGL® and the first commands and the third commands may be OpenGL® commands.

In some implementations, the first API may be Apple® Metal® and the first commands and the third commands may be Metal® commands.

In some implementations, the first API may be Vulkan® and the first commands and the third commands may be Vulkan® commands.

In some implementations, a method may be provided that may be performed by causing, using one or more processors, a game host engine to be provided, the game host engine configured to cause the one or more processors to: cause a graphics context for a first application programming interface (API) to be created in the one or more memory devices, obtain context information that identifies the graphics context, and send one or more first commands to the graphics context using the context information and the first API, where the one or more first commands may be configured to modify the graphics context to include data defining one or more first graphics objects defining lobby content. The method may further include obtaining, by the one or more processors, first game code representing a first game application, where the first game code includes one or more second commands for a second API and the second API may be different from the first API; executing, by the one or more processors, the first game code; providing an emulation layer that may be configured to convert commands for the second API into commands for the first API; converting, using the emulation layer, the one or more second commands for the second API into one or more third commands for the first API; sending the one or more third commands to the graphics context using the context information and the first API, where the one or more third commands may be configured to modify the graphics context to include data defining one or more second graphics objects representing gaming content; and causing graphical output to be rendered to at least one display device of one or more display devices according to the one or more first graphics objects and the one or more second graphics objects included in the graphics context, thereby producing blended computer graphics from the game host engine and the first game application using the graphics context.

In some implementations, the method may further include providing, using the one or more processors, a marketplace application that, when executed by the one or more processors, (a) causes the one or more processors to cause information to be retrieved via a network connection regarding a plurality of applications that may be downloadable to one or more storage devices accessible to the one or more processors and (b) causes one or more selected applications from the plurality of applications to be downloaded to the one or more storage devices accessible to the one or more processors and installed on one or more storage devices accessible to the one or more processors responsive to one or more inputs, where the game host engine may be associated with information stored on the one or more storage devices indicating that the game host engine was installed on the one or more storage devices accessible to the one or more processors by the marketplace application, and the first game code is not associated with information stored on the one or more storage devices indicating that the first game code was installed on the method by the marketplace application.

In some implementations, the marketplace application may be associated with a set of one or more first Internet addresses which are configured to provide the marketplace application with any of the applications of the plurality of applications responsive to one or more requests by the marketplace application, and the one or more storage devices may further store computer-executable instructions for controlling the one or more processors to obtain the first game code by downloading the first game code from an Internet address that is not in the set of one or more first Internet addresses.

In some implementations, the second API is WebGL™ and the first API is not WebGL™.

In some implementations, the game host engine may be executed within a first operating system, the first game code may be in an interpreted programming language, and the performance of the method may further include causing a language interpreter for the interpreted programming language to be executed. The language interpreter may be configured to interpret and execute the first game code and may include a first set of computer-executable instructions that govern interpretation of a first set of one or more commands of the interpreted programming language and a second set of computer-executable instructions that govern interpretation of the first set of one or more commands of the interpreted programming language. The first set of computer-executable instructions may be different from the second set of computer-executable instructions, and the method may further include selecting, based on the first operating system, the first set of computer-executable instructions or the second set of computer-executable instructions to use as a selected set of computer-executable instructions, and executing the first game code via the language interpreter using, at least in part, the selected set of computer-executable instructions.

In some implementations, the language interpreter may include a common set of computer-executable instructions that govern interpretation of a second set of one or more commands of the interpreted programming language, the first set of one or more commands and the second set of one or more commands may not overlap, and the method may further include executing the first game code via the language interpreter using the selected set of computer-executable instructions and the common set of computer-executable instructions.

In some implementations, the method may further include selecting the first set of computer-executable instructions as the selected set of computer-executable instructions when the operating system used by the method is Android™ and selecting the second set of computer-executable instructions as the selected set of computer-executable instructions when the operating system used by the method is iOS.

In some implementations, the first set of computer-executable instructions may govern interpretation and execution of the interpreted programming language based on Google V8 and the second set of computer-executable instructions may govern interpretation and execution of the interpreted programming language based on Webkit® JavaScriptCore.

In some implementations, the emulation layer may be configured to not cause any command to be sent to the graphics context that does not have a counterpart in the one or more second commands for the second API.

In some implementations, the one or more third commands, when executed by the hardware graphics rendering engine, may cause graphical content based on the one or more first graphics objects to be obscured, at least in part, by at least some graphical content based on the one or more second graphics objects only when the one or more third commands have counterparts in the one or more second commands for the second API.

In some implementations, the language interpreter may be configured to interpret and execute an interpreted programming language such as: JavaScript™, Java™, C#, TypeScript, Ruby, and Lua.

In some implementations, the game host engine may be provided using the Unity game engine and the language interpreter is a low-level Unity plugin.

In some implementations, the first API may be OpenGL® and the first commands and the third commands may be OpenGL® commands.

In some implementations the first API may be Apple® Metal® and the first commands and the third commands may be Metal® commands.

In some implementations, the first API may be Vulkan® and the first commands and the third commands may be Vulkan® commands.

In some implementations, a computer-readable, non-transitory medium storing one or more computer-executable instructions for controlling one or more processors of an electronic gaming machine having one or more display devices may be provided. In such implementations, the computer-executable instructions stored on the computer-readable, non-transitory medium may be configured to, when executed by the one or more processors, control the one or more processors to cause the one or more processors to: provide a game host engine, the game host engine configured to cause the one or more processors to: cause a graphics context for a first application programming interface (API) to be created in the one or more memory devices, obtain context information that identifies the graphics context, and send one or more first commands to the graphics context using the context information and the first API, where the one or more first commands are configured to modify the graphics context to include data defining one or more first graphics objects defining lobby content. The instructions may be further configured to cause the one or more processors to obtain first game code representing a first game application, where the first game code may include one or more second commands for a second API and the second API may be different from the first API. The instructions may also be further configured to cause the one or more processors to execute the first game code; provide an emulation layer that is configured to convert commands for the second API into commands for the first API; convert, using the emulation layer, the one or more second commands for the second API into one or more third commands for the first API; send the one or more third commands to the graphics context using the context information and the first API, where the one or more third commands are configured to modify the graphics context to include data defining one or more second graphics objects representing gaming content; and cause graphical output to be rendered to at least one of the one or more display devices according to the one or more first graphics objects and the one or more second graphics objects included in the graphics context, thereby producing blended computer graphics from the game host engine and the first game application using the graphics context.

In some implementations, the computer-readable, non-transitory medium may further store additional computer-executable instructions configured to, when executed by the one or more processors, control the one or more processors to provide a marketplace application that, when executed by the one or more processors, (a) causes the one or more processors to cause information to be retrieved via a network connection regarding a plurality of applications that are downloadable to one or more storage devices accessible to the one or more processors and (b) causes one or more selected applications from the plurality of applications to be downloaded to the one or more storage devices accessible to the one or more processors and installed on the one or more storage devices responsive to one or more inputs. In such implementations, the game host engine may be associated with information stored on the one or more storage devices accessible to the one or more processors indicating that the game host engine was installed on the one or more storage devices by the marketplace application, and the first game code may not be associated with information stored on the one or more storage devices accessible to the one or more processors indicating that the first game code was installed on the one or more storage devices by the marketplace application.

In some implementations, the marketplace application may be associated with a set of one or more first Internet addresses which are configured to provide the marketplace application with any of the applications of the plurality of applications responsive to one or more requests by the marketplace application, and the computer-readable, non-transitory medium may further store additional computer-executable instructions configured to, when executed by the one or more processors, control the one or more processors to obtain the first game code by downloading the first game code from an Internet address that is not in the set of one or more first Internet addresses.

In some implementations, the second API may be WebGL™ and the first API may not be WebGL™.

In some implementations, the game host engine may be configured to be executable within a first operating system, the first game code may be in an interpreted programming language, the computer-readable, non-transitory medium may further store additional computer-executable instructions configured to, when executed by the one or more processors, control the one or more processors to cause a language interpreter for the interpreted programming language to be executed, the language interpreter may be configured to interpret and execute the first game code, the language interpreter may include a first set of computer-executable instructions that govern interpretation of a first set of one or more commands of the interpreted programming language and a second set of computer-executable instructions that govern interpretation of the first set of one or more commands of the interpreted programming language, and the first set of computer-executable instructions may be different from the second set of computer-executable instructions. In such implementations, the computer-readable, non-transitory medium may further store additional computer-executable instructions configured to, when executed by the one or more processors, control the one or more processors to: select, based on the first operating system, the first set of computer-executable instructions or the second set of computer-executable instructions to use as a selected set of computer-executable instructions, and execute the first game code via the language interpreter using, at least in part, the selected set of computer-executable instructions.

In some implementations, the language interpreter may include a common set of computer-executable instructions that govern interpretation of a second set of one or more commands of the interpreted programming language, the first set of one or more commands and the second set of one or more commands may not overlap, and the computer-readable, non-transitory medium may further store additional computer-executable instructions configured to, when executed by the one or more processors, control the one or more processors to execute the first game code via the language interpreter using the selected set of computer-executable instructions and the common set of computer-executable instructions.

In some implementations, the computer-readable, non-transitory medium may further store additional computer-executable instructions configured to, when executed by the one or more processors, control the one or more processors to select the first set of computer-executable instructions as the selected set of computer-executable instructions when the operating system that the computer-executable instructions execute within is Android™, and select the second set of computer-executable instructions as the selected set of computer-executable instructions when the operating system that the computer-executable instructions execute within is iOS®.

In some implementations, the first set of computer-executable instructions may govern interpretation and execution of the interpreted programming language based on Google V8 and the second set of computer-executable instructions may govern interpretation and execution of the interpreted programming language based on Webkit® JavaScriptCore.

In some implementations, the emulation layer may be configured to not cause any command to be sent to the graphics context that does not have a counterpart in the one or more second commands for the second API.

In some implementations the one or more third commands, when executed by the hardware graphics rendering engine, may cause graphical content based on the one or more first graphics objects to be obscured, at least in part, by at least some graphical content based on the one or more second graphics objects only when the one or more third commands have counterparts in the one or more second commands for the second API.

In some implementations, the language interpreter may be configured to interpret and execute an interpreted programming language such as: JavaScript™, Java™, C#, TypeScript, Ruby, and Lua.

In some implementations, the game host engine may be provided using the Unity game engine and the language interpreter may be a low-level Unity plugin.

In some implementations, the first API may be OpenGL® and the first commands and the third commands may be OpenGL® commands.

In some implementations, the first API may be Apple® Metal® and the first commands and the third commands may be Metal® commands.

In some implementations, the first API may be Vulkan® and the first commands and the third commands may be Vulkan® commands.

In some implementations, a system is provided that includes one or more display devices, one or more processors, one or more memory devices, and one or more storage devices. In such implementations, the one or more display devices, the one or more processors, the one or more memory devices, and the one or more storage devices may be operably connected, and the one or more storage devices may store computer-executable instructions for controlling the one or more processors to: provide a game host engine, the game host engine configured to cause the one or more processors to cause a graphics context for a first application programming interface (API) to be created in the one or more memory devices, obtain context information that identifies the graphics context, and send one or more first commands to the graphics context using the context information and the first API, where the one or more first commands may be configured to modify the graphics context to include data defining one or more first graphics objects defining lobby content; obtain first game code representing a first game application responsive to input indicative of a selection of the first game application by a player via a graphical user interface provided by the lobby content, where the first game code includes one or more second commands for a second API and the second API may be different from the first API; execute the first game code; provide an emulation layer that may be configured to convert commands for the second API into commands for the first API; convert, using the emulation layer, the one or more second commands for the second API into one or more third commands for the first API; send the one or more third commands to the graphics context using the context information and the first API, where the one or more third commands may be configured to modify the graphics context to include data defining one or more second graphics objects representing gaming content; and cause graphical output to be rendered to at least one of the one or more display devices according to the one or more first graphics objects and the one or more second graphics objects included in the graphics context, thereby producing blended computer graphics from the game host engine and the first game application using the graphics context, the blended computer graphics providing a game presentation for play by the player in addition to the lobby content, the game presentation including one or more controls configured to receive one or more game play inputs from the player for controlling the first game application and, responsive to the one or more game play inputs, a display of one or more game outcomes determined by a random number generator, and the lobby content including one or more controls configured to be selectable by the player to initiate one or more lobby-related functions.

In some such implementations, the one or more storage devices may store further computer-executable instructions for controlling the one or more processors to provide a marketplace application that, when executed by the one or more processors, (a) causes the one or more processors to cause information to be retrieved via a network connection regarding a plurality of applications that are downloadable to the system, (b) provides a graphical user interface configured to receive inputs of player selections regarding one or more of the plurality of applications that are downloadable, and (c) causes one or more applications selected by the player from the plurality of applications to be downloaded to the system and installed on the one or more storage devices responsive to one or more inputs. In such implementations, the game host engine may be associated with information stored on the one or more storage devices indicating that the game host engine was installed on the system by the marketplace application, and the first game code is not associated with information stored on the one or more storage devices indicating that the first game code was installed on the system by the marketplace application.

In some implementations, the marketplace application may be associated with a set of one or more first Internet addresses which may be configured to provide the marketplace application with any of the applications of the plurality of applications responsive to one or more requests by the marketplace application, and the one or more storage devices may further store computer-executable instructions for controlling the one or more processors to obtain the first game code by downloading the first game code from an Internet address that is not in the set of one or more first Internet addresses.

In some implementations, the second API is WebGL™ and the first API is not WebGL™.

In some implementations, the system may be configured to execute the game host engine within a first operating system, the first game code may be in an interpreted programming language, the one or more storage devices may store further computer-executable instructions for controlling the one or more processors to cause a language interpreter for the interpreted programming language to be executed, the language interpreter may be configured to interpret and execute the first game code, the language interpreter may include a first set of computer-executable instructions that govern interpretation of a first set of one or more commands of the interpreted programming language and a second set of computer-executable instructions that govern interpretation of the first set of one or more commands of the interpreted programming language, the first set of computer-executable instructions may be different from the second set of computer-executable instructions, and the one or more storage devices may further store computer-executable instructions for controlling the one or more processors to: select, based on the first operating system, the first set of computer-executable instructions or the second set of computer-executable instructions to use as a selected set of computer-executable instructions, and execute the first game code via the language interpreter using, at least in part, the selected set of computer-executable instructions.

In some implementations, the language interpreter may include a common set of computer-executable instructions that govern interpretation of a second set of one or more commands of the interpreted programming language, the first set of one or more commands and the second set of one or more commands may not overlap, and the one or more storage devices may further store computer-executable instructions for controlling the one or more processors to execute the first game code via the language interpreter using the selected set of computer-executable instructions and the common set of computer-executable instructions.

In some implementations, the one or more storage devices may further store computer-executable instructions for controlling the one or more processors to select the first set of computer-executable instructions as the selected set of computer-executable instructions when the operating system used by the system may be Android™ and select the second set of computer-executable instructions as the selected set of computer-executable instructions when the operating system used by the system may be iOS®.

In some implementations, the first set of computer-executable instructions may govern interpretation and execution of the interpreted programming language based on Google V8 and the second set of computer-executable instructions may govern interpretation and execution of the interpreted programming language based on Webkit® JavaScriptCore.

In some implementations, the emulation layer may be configured to not cause any command to be sent to the graphics context that does not have a counterpart in the one or more second commands for the second API.

In some implementations, the one or more third commands, when executed by the hardware graphics rendering engine, may cause graphical content based on the one or more first graphics objects to be obscured, at least in part, by at least some graphical content based on the one or more second graphics objects only when the one or more third commands have counterparts in the one or more second commands for the second API.

In some implementations, the language interpreter may be configured to interpret and execute an interpreted programming language such as: JavaScript™, Java™, C#, TypeScript, Ruby, and Lua.

In some implementations, the game host engine may be provided using the Unity game engine and the language interpreter may be a low-level Unity plugin.

In some implementations, the first API may be OpenGL® and the first commands and the third commands may be OpenGL® commands.

In some implementations, the first API may be Apple® Metal® and the first commands and the third commands may be Metal® commands.

In some implementations, the first API may be Vulkan® and the first commands and the third commands may be Vulkan® commands.

DETAILED DESCRIPTION

Figure 1:
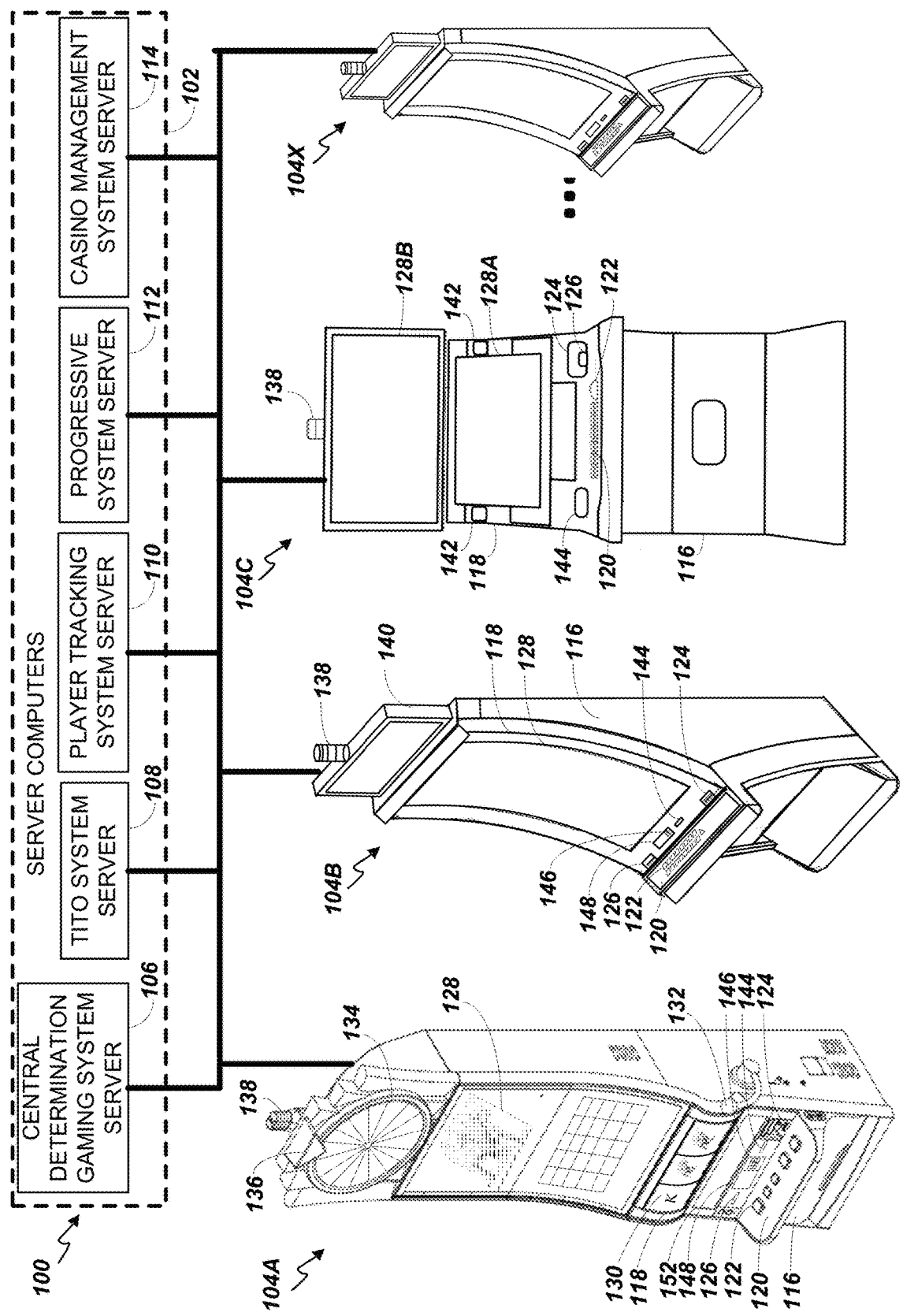
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat™ Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
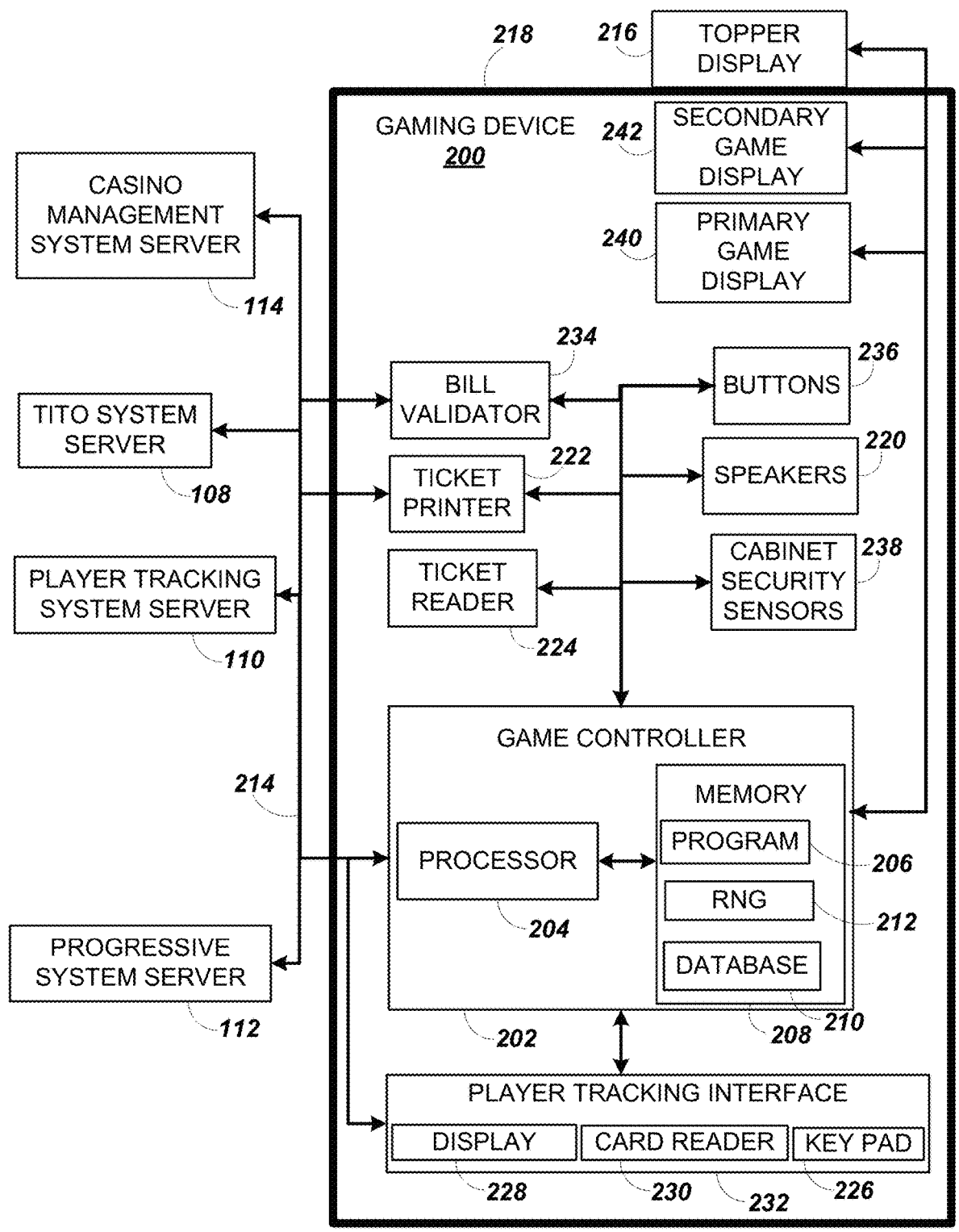
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat™ Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat™ Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG), e.g., a pseudorandom number generator, 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving a player loyalty card, and a transceiver for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS™ system manufactured by Aristocrat™ Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

While the architectures and techniques discussed herein may be implemented in standard electronic gaming machines, e.g., electronic gaming machines such as may be placed on the floor of a casino, such architectures and techniques may be particularly applicable to smartphone and/or tablet implementations of gaming machines, or smartphone and/or tablet implementations running software that presents a virtual or simulated gaming machine. In some such implementations, the software may allow the player to purchase tokens that may then be used as credits during play of one or more wagering games. The use of the architectures and techniques discussed herein may allow for such a mobile or handheld device to seamlessly provide a graphics presentation that includes content that originates from programs executing using two different graphics library APIs. To provide further understanding, the concepts discussed earlier are discussed below in more details with respect to various Figures.

Figure 3:
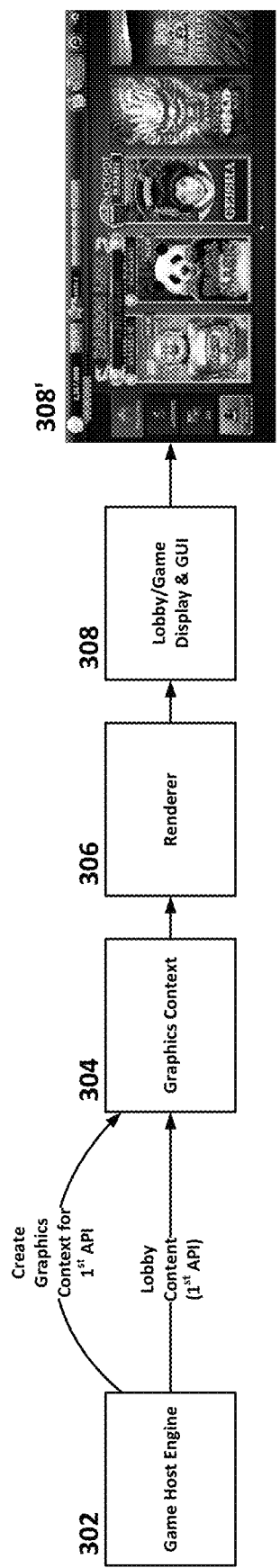
FIG. 3 is a block diagram of a partial architecture according to the present disclosure.

FIG. 3 is a block diagram of a partial architecture according to the present disclosure. In FIG. 3, a game host engine 302 for architecture 300 is provided; the game host engine 302 may be one or more executable sets of machine-readable instructions that may control one or more processors of a device implementing the architecture to perform various actions for generating, for example, a graphical user interface (GUI) that facilitates user selection and management of one or more wagering games. Such a GUI may be referred to herein as a "lobby" since it may serve as an interface that allows for the user to access and play any of a plurality of game applications, or to access features that may be independent of any particular game application.

In order to present the GUI, the game host engine 302 may be configured to utilize a first API (API), e.g., OpenGL®, Metal®, or Vulkan®. In preparation for using the first API, the game host engine 302 may cause a graphics context 304 for the first API to be created in one or more memory devices, e.g., in association with a display window. For example, the game host engine 302 may request that a window manager of the operating system of the device having the one or more processors provide a display window for use by the game host engine and that the graphics context 304 for the first API be created for that display window. A graphics context, generally speaking, may be thought of as a data structure that contains all of the data needed to render an image of a particular scene for display on a device. Such data may be provided to the graphics context through commands sent via the associated API. For the OpenGL® API, the graphics context is commonly referred to as an "OpenGL® context." For the Apple® Metal® API, the graphics context is typically referred to as a "core image context" or "CIContext" and for the Vulkan® API, the graphics context is typically referred to as a "vkDevice." It will be understood that the term "graphics context," as used herein, may refer to an OpenGL® context, a CIContext, vkDevice, or any equivalent data structure that serves to store and manage data defining one or more graphics objects and provided through commands sent through an associated API prior to such data being accessed by a renderer and rendered. Graphics contexts are typically associated with a specific API and may be incompatible with other APIs, e.g., an OpenGL® graphics context is associated with the OpenGL® API and can thus be interacted with using commands from the OpenGL® API, but commands sent to the same context using commands from another API, e.g., WebGL™, may be ineffective. APIs for interacting with graphics contexts, e.g., such as OpenGL®, Metal®, or Vulkan® (and which may be used as the first and/or second APIs discussed herein), may also be referred to as "graphics library APIs" or "GLAPIs" herein, although it will be understood that some APIs that may be used to interact with graphics contexts may also include extensive additional functionality that is not directly related to graphics provisioning.

The game host engine 302, in association with creation of the graphics context 304, may obtain context information that identifies the graphics context 304 or otherwise provides the game host engine 302 with the ability to send first commands using the first API to the graphics context 304. For example, if multiple graphics contexts exist, e.g., a graphics context 304 created by the game host engine 302 and another graphics context created by another program, then the context information may be used by the game host engine 302 to ensure that any first API commands sent by the game host engine 302 are directed to the graphics context 304 that the game host engine 302 caused to be created as opposed to the other graphics context.

Once the graphics context 304 has been created and the context information for the graphics context 304 has been obtained by the game host engine 302, the game host engine 302 may start sending commands to the graphics context 304 using the first API to cause data defining or representing one or more graphics objects to be created or modified in the graphics context 304 and then rendered by a renderer 306 into a succession of images that are displayed to provide a GUI, e.g., a lobby 308. Thus, for example, the commands sent using the first API may cause data to be created in the graphics context 304 that define one or more graphics objects defining lobby-related graphical content. In FIG. 3, an example lobby GUI 308' is shown that displays user-selectable controls for selecting between a plurality of game applications (user-selectable controls for four or five game applications are shown), as well as various other controls, such as tab controls on the left side of the GUI for displaying different categories of game applications for selection. Various other user-selectable controls may be provided as part of the lobby GUI as well, such as, for example, a button for accessing social media sign-in features, audio controls, technical support, etc., a count-down timer/bar that, when full, can be selected by the user in order to redeem a number of bonus credits, a button for accessing an online store interface that allows for direct purchase of credits for use in various games (such as wagering games), a button for accessing special offers, a button for accessing upcoming events or currently offered events (such as tournaments, etc.), and so forth.

Figure 4:
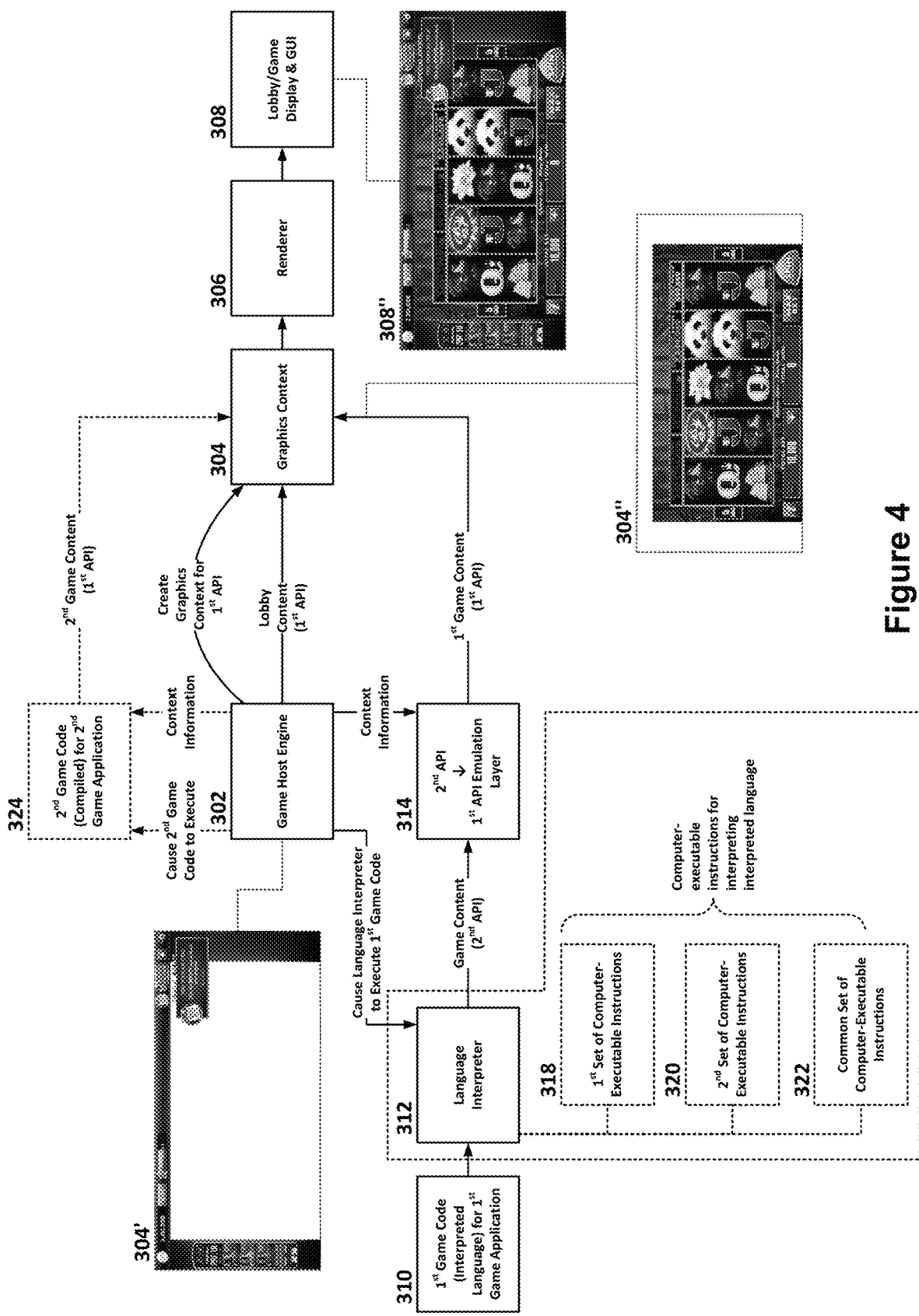
FIG. 4 is a block diagram of a partial architecture according to the present disclosure.

The architecture shown in FIG. 3 is only a partial example of the architectures discussed herein; FIG. 4 depicts the same architecture, but with further elements depicted. These further elements may come into play when a game application is actually being executed. In FIG. 4, the game host engine 302 has caused first game code 310 for a first game application to be obtained. The game host engine 302 may obtain the first game code 310 for the first game application in response to a user selection of a corresponding game from, for example, a game selection interface (such as is shown in GUI 304'). The game host engine 302 may, for example, obtain the first game code 310 from storage local to the device on which the architecture is implemented or may obtain the first game code 310 from a remote storage device, e.g., via the Internet or via another network.

The first game code 310 may be provided in an interpreted language, e.g., Javascript™, Java™, Typescript, etc. The game host engine 302 may also cause a language interpreter 312 to be executed in order to interpret and execute the first game code 310 to provide the first game application. The language interpreter 312, as mentioned earlier, may be configured to interpret and execute commands in the interpreted language used to provide the first game code 310. In other implementations, however, the first game code may be provided as compiled or pre-compiled code, e.g., a binary file, that does not require a language interpreter in order to be executed. In such implementations, the game host engine may simply cause the first game code to be executed directly, e.g., by causing the operating system to initiate execution of the first game code (without the use of a language interpreter).

The first game code 310 is configured to generate commands using a second API—different from the first API—in order to provide graphical game content. Such a second API may, for example, be WebGL™, which is a API commonly used to provide three-dimensional graphical content for web browsers. Thus, the first game code 310 may thus be capable of being executed by a standard web browser of any suitable operating system to provide the first game application if the web browser provides access to a language interpreter that is configured to interpret the interpreted language used for the first game code 310. This allows the first game code 310 to not only be used in the architecture discussed herein, but be more broadly usable by generally any computing device having a web browser. In the architecture discussed herein, however, the first game code 310 may be executed in a manner that allows the graphical content for the first game application produced thereby to be seamlessly integrated with additional graphical content from the game host engine 302 which is provided using a different API, i.e., the first API.

To allow for the integrated presentation of graphics from both the game host engine and the first game application, the game host engine 302 may also cause an emulation layer 314 to be provided. The emulation layer 314 may, for example, be configured to receive commands sent using the second API, such as may be produced through interpretation of the first game code 310 by the language interpreter 312, and translate them into corresponding commands using the first API. The game host engine 302 may also cause the emulation layer 314 to be provided with the context information that identifies the graphics context 304, thereby allowing the emulation layer 314 to direct the commands for the second API that have been translated into corresponding commands for the first API to the graphics context 304. Thus, the graphics context 304 may receive first API commands from both the game host engine 302 and, through the emulation layer 314, the first game code 310 for the first game application. As both the game host engine 302 and the first game code 310 are able to effectively send first API commands to the graphics context 304, the graphics context 304 may contain data that defines graphics objects generated by both the game host engine 302 and the first game code 310; thus, when the renderer 306 renders graphical content based on the graphics context 304, the resulting graphical content 308" that is rendered may include content that originates from the game host engine 302, e.g., lobby content (such as graphical content 304'), and content that originates from the first game application, e.g., a game GUI (such as graphical content 304"). As can be seen in this particular example, the lobby content 304' may include an overlay that extends along the sides and top of a display window, and the game content 304" may include a slot machine interface that may be visible in the region bracketed by the lobby graphical content. In other implementations, other arrangements of graphical content may be implemented, e.g., the lobby content 304' may extend along one or more other edges of the display window, or may not even extend along an edge of the display window at all, e.g., may take the form of one or more "floating" buttons that are positioned near an edge of the display window but not necessarily extending all the way to the edge of the display window or a menu interface that may be presented in the middle of the display window, surrounded by graphical content from the first game application, and so on.

In this example, some of the lobby graphical content extends into the region occupied by the game GUI (in the upper right corner, for example, a message box indicating "You won an item!" extends from the right side of the lobby GUI and into the region occupied by the game application content 304"). In order to ensure that such lobby GUI content is rendered such that it overlays the graphical content for the first game application, the game host engine and the first game application may, for example, be configured such that each application may have preallocated depth buffer ranges that are applied to graphics objects originating from each application. For example, the game host application may be preallocated a first depth buffer range that is located above a second depth buffer range preallocated to the first game application, thereby ensuring that the lobby GUI content overlays the first game application content. In some instances, there may be additional depth buffer ranges that may be accessible to the game host engine and/or the first game application. For example, the first game application may be preallocated a third depth buffer range that is above the first and second depth buffer ranges, which may be used, for example, to display temporary game graphics, e.g., a fireworks animation to celebrate a game winning outcome, that are overlaid on both the normal first game application graphics and the lobby GUI content.

In some implementations of the architecture, the language interpreter 312 may be additionally configured to select between multiple sets of computer-executable instructions 316 when interpreting one or more particular commands of the interpreted language depending on various factors. For example, the language interpreter may utilize a first set of computer-executable instructions 318 that govern interpretation and execution of a corresponding first set of interpreted language commands when the language interpreter is executing in a first type of operating system, but may utilize a second set of computer-executable instructions 320 that govern interpretation and execution of that same first set of interpreted language commands when the language interpreter is executing in a second type of operating system different from the first type of operating system. Interpreted language commands that are interpreted using the first or second sets of computer-executable instructions will generally provide the same functionality regardless of which set of computer-executable instructions are used to interpret those commands, but the manner in which that functionality is provided may differ between the two sets of computer-executable instructions.

In some implementations, the first set of computer-executable instructions may govern interpretation and execution of the first set of interpreted language commands in a manner compliant with implementations of the Google V8 JavaScript™ engine, which may be used when the operating system in question is an Android™ operating system, and the second set of computer executable instructions may govern interpretation and execution of the first set of interpreted language commands in a manner compliant with implementations of the Webkit® JavaScriptCore JavaScript™ engine, which may be used when the operating system in question is an Apple® iOS® operating system.

For example, the TypeScript WebGL™ command WebGLRenderingContext.clear( ) requires implementation of two syntactically different JavaScript™-to-C++ bindings for V8 and JavaScriptCore engines using the Android™ and iOS® operating systems, respectively, that are semantically indistinguishable.

For V8, this binding could be defined as:

```
defineFunc("clear", [ ](const FunctionCallbackInfo<Value> &args) {
    GL(args)->clear(args[0]->Int32Value( ));
});
```

While for JavaScriptCore, this binding could be defined as:

```
defineFunc("clear", [ ] (JSContextRef ctx, JSObjectRef function,
JSObjectRef obj, size_t
argCount, const JSValueRef args [ ], JSValueRef *exception) ->
JSValueRef {
    GL(obj)->clear(JSValueToNumber(ctx, args[0], 0));
    return 0;
});
```

Both bindings result in the equivalent interpretation of WebGLRenderingContext.clear( ) when interpreted by the respective engine for which they are defined.

There may also be an additional, common set of computer-executable instructions 322 that may be used by the language interpreter to interpret a second set of interpreted language commands regardless of in which operating system the language interpreter is executed. The common set of computer-executable instructions may govern interpretation and execution of the second set of interpreted language commands where the manner in which such interpreted language commands are interpreted is not dependent on in which operating system the language interpreter is executing. Thus, the second set of interpreted language commands may not overlap with the first set of interpreted language commands.

It will be understood that the language interpreter may be configured to be compatible with more than just two operating systems and may, in some instances, be configured to provide an operating system-specific set of computer-executable instructions for interpreting one or more interpreted language commands for each operating system under which it is configured to execute. In such implementations, a common set of computer executable instructions may be provided that govern interpretation and execution of interpreted language commands that are interpreted and executed in the same way regardless of which operating system is applicable.

In some implementations, the architecture may optionally facilitate execution of game applications for which game code is not provided in an interpreted language, e.g., the game code may be compiled for execution by the operating system under which the game host engine 302 is provided. In FIG. 4, such game code is represented by second game code 324, which is compiled for execution under the operating system under which the game host engine 302 executes. The game host engine 302 may provide the executing second game code 324 with the context information that identifies the graphics context 304, thereby allowing the second game code 324, which may be configured to generate commands using the first API, to send commands using the first API to the graphics context 304, where it may cause one or more graphics objects associated with the second game application to be defined in the graphics context 304. Thus, the graphical content arising from execution of the second game code 324 may be blended with graphical content arising from the execution of the game host engine 302 in the same way as graphical content arising from the execution of the first game code 310. Such an implementation may allow the game host engine 302 to operate in conjunction with game applications that may be distributed as operating system-specific compiled code as well as game applications that may be distributed using interpreted language code. In either case, the graphical content provided by the game host engine 302 may be seamlessly integrated with the graphical content arising through execution of whatever game code is used to provide a game application in a common graphical context 304 to provide a unified GUI presentation 308".

Generally speaking, the emulation layer 314 may be configured to avoid sending first API commands to the graphics context that do not have counterparts in the second API commands received by the emulation layer. Similarly, the emulation layer 314 may be configured to avoid translating a second API command into a corresponding first API command in a manner that would modify the graphical content that ultimately results from the data that is generated or modified in the graphics context in response to the translated first API command from what the equivalent graphical content would look like if the untranslated second API commands were to instead be sent to a graphics context for the second API and rendered.

Thus, for example, the emulation layer 314 would not send a first API command to the graphics context for generating a uniform background color field, e.g., a white background, unless actually provided with a second API command that specifically called for a corresponding graphics object to be created. Additionally, the emulation layer 314 would not modify the first API commands sent to the graphics context in a way that would alter the depth at which the resulting graphics objects would be located. For example, multiple graphics objects may be defined in a graphics context such that, when rendered, certain graphics objects are positioned behind other graphics objects, resulting in partial or complete occlusion in the rendered scene of the graphics objects that are behind the other graphics objects. The emulation layer may be configured to not modify the depth of the graphics objects generated by the first API commands sent to the graphics context. Thus, if a graphics object generated from data originating from a first API command sent by the emulation layer 314 overlaps, when rendered from the graphics context, a graphics object originating from a first API command sent by the game host engine 302, then such overlap only occurs because the first API commands sent by the game host engine and the second API commands provided by the interpreted language code (prior to conversion into the first API) cause those graphics objects to be located at their respective depths.

As mentioned earlier, in some implementations, the architectures discussed herein may allow for execution of programs on devices that are provided through mechanisms that may differ from how most other programs are provided on such devices. For example, many smartphones and tablet computers, e.g., devices that run the Android™ or iOS® operating systems, may include a "marketplace" application that serves as a distribution and installation hub for compiled applications that may be installed on such devices. In some instances, the marketplace application may generally be the only mechanism by which additional applications may be installed on such devices (aside from applications that may be installed as part of operating system updates). The marketplace application may act as a gatekeeper to help control which applications are installed on the device; the marketplace provider may, for example, review applications that are submitted by developers for distribution via the marketplace application to evaluate if such applications comply with various quality control, privacy, and security requirements. Such applications may only be permitted by the marketplace application provider to be distributed if such applications meet such requirements. In some implementations, such a device may have multiple marketplace applications that may operate in such a manner, any one of which may be used to install compiled applications on the device. In the present architectures, the game host engine 302 may provide an alternate mechanism to a marketplace application for downloading and executing applications. Since the game code 310 for the game applications that the game host engine 302 may cause to be obtained may be downloaded as an interpreted language, it is not considered to be a pre-compiled executable that is subject to the marketplace distribution paradigm. As a result, game applications provided via an interpreted language may be obtained directly from the developer of such applications, thereby bypassing such marketplace applications.

Marketplace applications may, in general, cause information regarding a plurality of applications that may be downloadable to the computing device executing the marketplace application to be retrieved and presented to a user, allowing the user to make informed decisions as to which applications to select for installation. Such marketplace applications may allow a user to select, e.g., responsive to one or more inputs provided by the user, one or more applications offered by the marketplace application to be downloaded to the computing device and installed on one or more storage devices associated with the computing device. The game host engine, for example, may be such an application and may be associated, upon installation, with information that indicates that the game host engine was installed on the computing device via that marketplace application. In contrast, the interpreted language game code 310 for the game applications that are downloaded and installed by the game host engine 302 may not be associated with information that indicates that such applications were installed on the computing device via the marketplace application.

Marketplace applications may generally be associated with one or more Internet addresses which are configured to provide the marketplace application with any of the applications that are offered via the marketplace application responsive to one or more requests by the marketplace application. For example, if a user requests a particular application offered by the marketplace application, the marketplace application may download that application via one of the Internet addresses associated with the marketplace application. In contrast, the interpreted language game code 310 for the game code applications that are downloaded by the game host engine 302 may be downloaded from Internet addresses that are not associated with the marketplace application.

Figure 5:
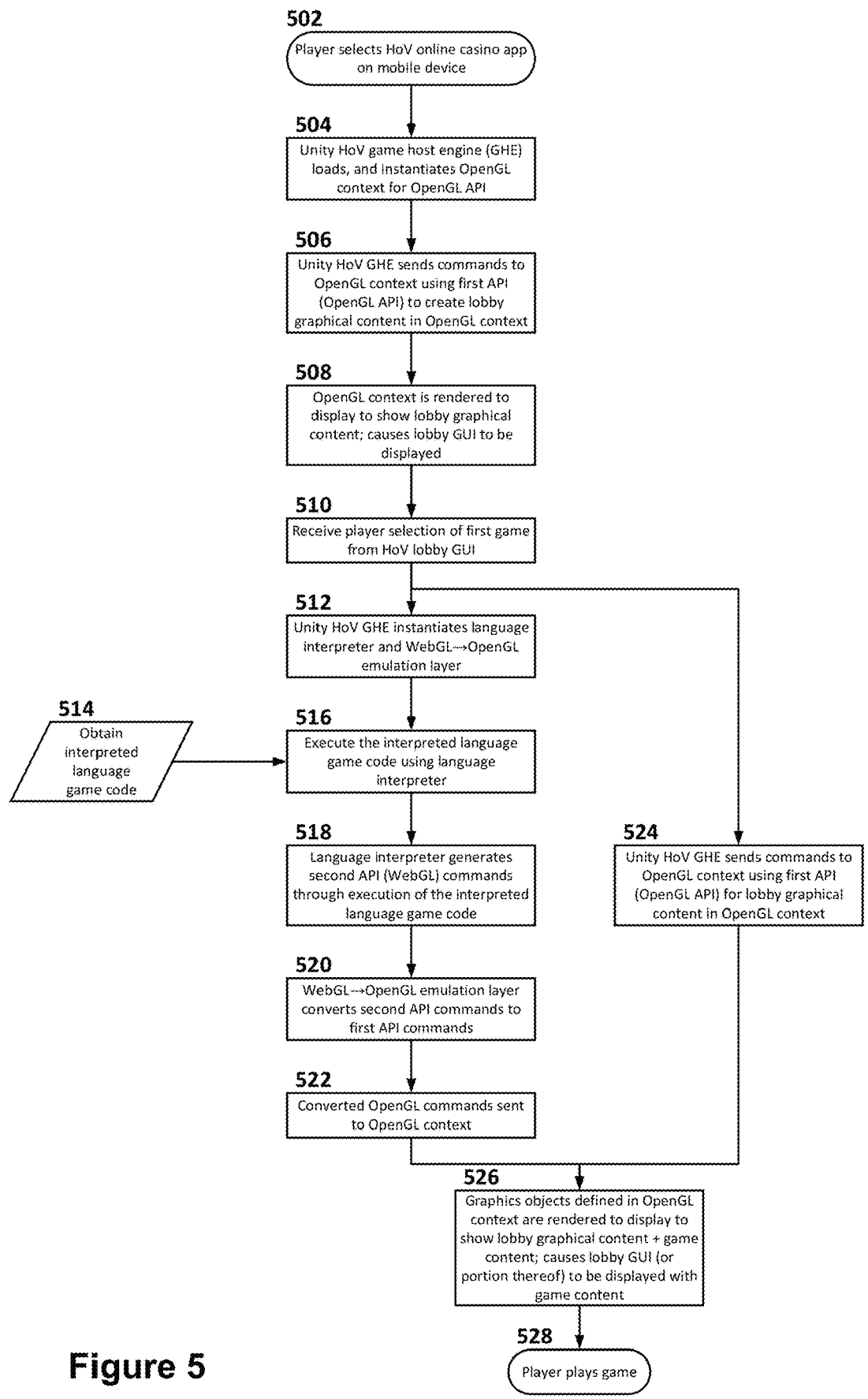
FIG. 5 is a diagram of a set of operations as may be implemented using the architecture according to the present disclosure.

FIG. 5 depicts a flow diagram of a technique that may be implemented using an architecture such as those disclosed herein. In the depicted technique, the game host engine is, for example, the "Heart of Vegas™" ("HoV") offered by Aristocrat Technologies Australia Pty. Ltd., although the technique discussed with reference to FIG. 5 may be practiced with other types of game host engines as well. In block 502, a player selects the HoV application, i.e., the game host engine, on a mobile device, e.g., a tablet computer or smartphone. The game host engine may, in block 504, load and execute on the mobile device responsive to such selection. In some implementations, the game host engine may be provided using the Unity platform, which is a popular multi-platform software engine that allows developers to develop code in a single development environment and then compile that code for execution under any of a number of different operating systems.

In block 504, the game host engine, e.g., HoV, may also cause an instance of an OpenGL® context, e.g., a graphics context, to be created or instantiated. The graphics context may be configured to be accessed via a first API, e.g., OpenGL®. In block 506, the HoV game host engine may send commands to the OpenGL® context using the OpenGL® API in order to cause graphical objects to be defined in the OpenGL® context that represent graphical content for a lobby GUI. In block 508, such graphical content may be rendered to a display window to depict the graphical content and cause a lobby GUI to be displayed. Such a lobby GUI may, for example, provide for a plurality of user-selectable game applications that may be available for play responsive to a user selection—either immediately or after having been downloaded responsive thereto. In block 510, information regarding a user selection of a particular game application via the lobby GUI may be received by the processors of the device on which the game host engine is provided.

In response to the user selection of block 510, the game host engine may, in block 512, cause a language interpreter and first API/second API emulation layer, e.g., WebGL™ to OpenGL® emulation layer, to be instantiated. The language interpreter and/or the emulation layer may also be instantiated prior to selection of a particular game application via the lobby GUI.

In block 514, the game host engine may obtain the interpreted language game code for the selected game application, e.g., from local storage or from a network location, such as over the Internet. In block 516, the obtained interpreted language game code may be executed using the language interpreter provided in block 512. During execution, the interpreted language game code may, in block 518, generate one or more second API commands, e.g., commands using the WebGL™ API, that may, when generated during execution in association with a web browser offering WebGL™ graphics capabilities, cause graphics objects to be defined in a WebGL™ context. In the architecture of FIG. 5, however, the second API commands generated by the interpreted language game code are not able to be sent to the graphics context created by the game host engine to cause graphics objects to be defined therein since the graphics context is configured to be responsive to the first API and not the second API. Thus, prior to providing the second API commands to the graphics context, the second API commands may be translated into equivalent first API commands by the emulation layer in block 520. In block 522, the translated first API commands, e.g., OpenGL® commands, may be sent to the OpenGL® context to cause graphics objects originating through the execution of the game application interpreted language code to be defined in the OpenGL® context. At the same time, the HoV game host engine may send additional first API commands to the OpenGL® context to cause additional graphics objects originating through the execution of the game host engine to be defined in the OpenGL® context. Thus, the single OpenGL® context may include data that defines graphical objects originating from both the pre-compiled code for the game host engine and the interpreted language code for the game application.

In block 526, the graphics objects defined in the OpenGL® context may be rendered to a display window to show combined graphical content for the lobby and the game application simultaneously as a seamless presentation.

In block 528, the player may then play the requested game application, e.g., by providing one or more inputs to the computing device.

Figure 6:
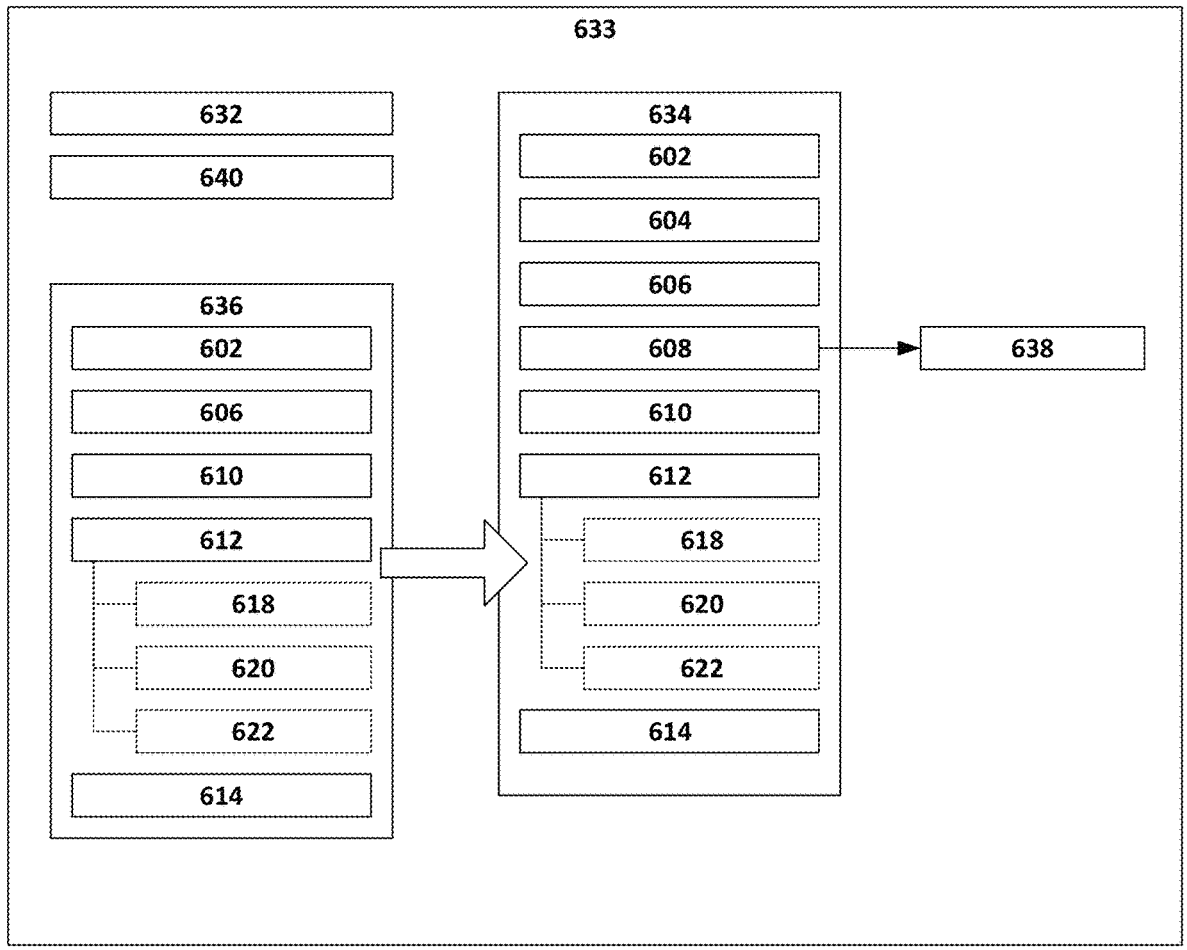
FIG. 6 depicts a block diagram of a computing device that may be used in implementations of the present disclosure.

Generally speaking, the architectures provided herein may be provided on an appropriate computing device having one or more processors, one or more display devices, one or more memory devices, and one or more storage devices. FIG. 6 depicts a high-level block diagram of an example of such a computing device. In FIG. 6, a computing device 600 is depicted that includes one or more processors 632 that are operatively connected with one or more memory devices 634, one or more storage devices 636, and one or more display devices 638. The one or more processors 632 may also, in some implementations, be operatively connected with one or more communications device 640, e.g., Ethernet adapters, wireless adapters, etc.

The one or more storage devices 636 may store, for example, a game host engine 602 application, a renderer 606 application, game code 610 for one or more game applications, a language interpreter 612 application, and a $2^{nd}$ API to $1^{st}$ API emulation layer 614. The one or more storage devices 636 may also store, optionally, a first set of computer-executable instructions 618, a second set of computer-executable instructions 620, and a common set of computer-executable instructions 622, e.g., to support a language interpreter 612 that may utilize different computer-executable instructions to interpret the interpreted language of the game code 610 depending on, for example, which operating system is being used by the one or more processors 632.

During operation, the game host engine 602 may be copied into the one or more memory devices 634 or otherwise rendered executable by the one or more processors 632 and may be used to create a graphics context 604 in the one or more memory devices 634. The renderer 606, the game code 610 for a selected game application, the language interpreter 612, and the $2^{nd}$ API to $1^{st}$ API emulation layer 614 may similarly be instantiated in the one or more memory devices 334 and executed by the one or more processors 632 to provide, via the renderer 608, graphical content that may then be sent to the one or more display devices 638 to provide for a unified lobby and game GUI.

As noted earlier, while the implementations discussed herein are particularly applicable to smartphones and tablets that may be configured to provide gaming experiences, e.g., wagering game experiences, such techniques and architectures may also be implemented in stationary electronic gaming machines, such as may be found on a casino floor. Such architectures and techniques may, for example, be used to provide web-hosted game content on such electronic gaming machines, thereby providing enhanced flexibility in terms of the number and types of games available for play.

It will be understood that the various techniques or operations discussed herein are not intended to suggest a particular order of operations unless an order of operations is inherent in the various stages of the techniques or operations discussed. For example, if a technique includes a first operation that produces a result that is required for a second operation to be performed, then the first operation would necessarily need to be performed prior to the second operation. However, if the first operation is merely shown earlier in a process diagram than the second operation, but there is no actual dependency between the first operation and the second operation, then it will be understood that, generally speaking, the first operation and the second operation may be performed in any order. Similarly, ordinal indicators, e.g., (a), (b), (c), etc., and arrows shown in the Figures used herein are used, unless otherwise indicated (either explicitly or inherently), to facilitate organization and for clarity; they are not intended to, and should not be understood to, necessarily convey a particular order or sequence of events. It will also be understood that the various operations discussed herein may be performed in manners other than as discussed. For example, various operations, in some implementations, nay be combined into a lesser number of distinct operations (for example, as discussed earlier, hashing of an operating system dataset may occur after the operating system dataset is copied to the operating system partition, e.g., as a separate operation after the copying is finished, or may, alternatively, be performed as the operating system dataset is copied, e.g., as a combined operation) or may be split apart into a greater number of operations; all such permutations are considered within the scope of this disclosure.

In this disclosure, the term "corresponding" or the phrase "corresponds with" is used, in some instances, to refer to items that have a relationship with one another. For example, a particular graphics context will have a corresponding API that may be used to send commands to that graphics context. Similarly, commands for a first API may have corresponding counterpart commands in a second API that may produce identical or similar end results when implemented in a graphics context specific to the second API as compared with the results obtained when such first API commands are implemented in a graphics context specific to the first API.

It is to be understood that the phrases "for each <item> of the one or more <items>," "each <item> of the one or more <items>," or the like, if used herein, should be understood to be inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A system comprising:
one or more display devices;
one or more processors;
one or more memory devices; and
one or more storage devices, wherein:
the one or more display devices, the one or more processors, the one or more memory devices, and the one or more storage devices are operably connected, and
the one or more storage devices store computer-executable instructions for controlling the one or more processors to:
provide a game host engine, the game host engine configured to cause the one or more processors to:
cause a graphics context for a first application programming interface (API) to be created in the one or more memory devices,
obtain context information that identifies the graphics context, and
send one or more first commands to the graphics context using the context information and the first API, wherein the one or more first commands are configured to modify the graphics context to include data defining one or more first graphics objects defining lobby content;
obtain first game code representing a first game application responsive to input indicative of a selection of the first game application by a player via a graphical user interface provided by the lobby content, wherein:
the first game code includes one or more second commands for a second API, and
the second API is different from the first API;
execute the first game code;
provide an emulation layer that is configured to convert commands for the second API into commands for the first API;
convert, using the emulation layer, the one or more second commands for the second API into one or more third commands for the first API;
send the one or more third commands to the graphics context using the context information and the first API, wherein the one or more third commands are configured to modify the graphics context to include data defining one or more second graphics objects representing gaming content; and
cause graphical output to be rendered to at least one of the one or more display devices according to the one or more first graphics objects and the one or more second graphics objects included in the graphics context, thereby producing blended computer graphics from the game host engine and the first game application using the graphics context, the blended computer graphics providing a game presentation for play by the player in addition to the lobby content, the game presentation including one or more controls configured to receive one or more game play inputs from the player for controlling the first game application and, responsive to the one or more game play inputs, a display of one or more game outcomes determined by a random number generator, and the lobby content including one or more controls configured to be selectable by the player to initiate one or more lobby-related functions.

2. The system of claim 1, wherein:
the one or more storage devices store further computer-executable instructions for controlling the one or more processors to provide a marketplace application that, when executed by the one or more processors, (a) causes the one or more processors to cause information to be retrieved via a network connection regarding a plurality of applications that are downloadable to the system, (b) provides a graphical user interface configured to receive inputs of player selections regarding one or more of the plurality of applications that are downloadable, and (c) causes one or more selected applications from the plurality of applications to be downloaded to the system and installed on the one or more storage devices responsive to one or more inputs,
the game host engine is associated with information stored on the one or more storage devices indicating that the game host engine was installed on the system by the marketplace application, and
the first game code is not associated with information stored on the one or more storage devices indicating that the first game code was installed on the system by the marketplace application.

3. The system of claim 2, wherein:
the marketplace application is associated with a set of one or more first Internet addresses which are configured to provide the marketplace application with any of the applications of the plurality of applications responsive to one or more requests by the marketplace application, and
the one or more storage devices further store computer-executable instructions for controlling the one or more processors to obtain the first game code by downloading the first game code from an Internet address that is not in the set of one or more first Internet addresses.

4. The system of claim 1, wherein the second API is WebGL™ and the first API is not WebGL™.

5. The system of claim 1, wherein:
the system is configured to execute the game host engine within a first operating system,
the first game code is in an interpreted programming language,
the one or more storage devices store further computer-executable instructions for controlling the one or more processors to cause a language interpreter for the interpreted programming language to be executed,
the language interpreter is configured to interpret and execute the first game code, the language interpreter includes a first set of computer-executable instructions that govern interpretation of a first set of one or more commands of the interpreted programming language and a second set of computer-executable instructions that govern interpretation of the first set of one or more commands of the interpreted programming language,
the first set of computer-executable instructions is different from the second set of computer-executable instructions, and
the one or more storage devices further store computer-executable instructions for controlling the one or more processors to:
select, based on the first operating system, the first set of computer-executable instructions or the second set of computer-executable instructions to use as a selected set of computer-executable instructions, and
execute the first game code via the language interpreter using, at least in part, the selected set of computer-executable instructions.

6. The system of claim 5, wherein:
the language interpreter includes a common set of computer-executable instructions that govern interpretation of a second set of one or more commands of the interpreted programming language,
the first set of one or more commands and the second set of one or more commands do not overlap, and
the one or more storage devices further store computer-executable instructions for controlling the one or more processors to:
execute the first game code via the language interpreter using the selected set of computer-executable instructions and the common set of computer-executable instructions.

7. The system of claim 5, wherein the one or more storage devices further store computer-executable instructions for controlling the one or more processors to:
select the first set of computer-executable instructions as the selected set of computer-executable instructions when the operating system used by the system is Android™, and select the second set of computer-executable instructions as the selected set of computer-executable instructions when the operating system used by the system is iOS®.

8. A method comprising:
causing, using one or more processors, a game host engine to be provided, the game host engine configured to cause the one or more processors to:
cause a graphics context for a first application programming interface (API) to be created,
obtain context information that identifies the graphics context, and
send one or more first commands to the graphics context using the context information and the first API, wherein the one or more first commands are configured to modify the graphics context to include data defining one or more first graphics objects defining lobby content;
obtaining, by the one or more processors, first game code representing a first game application, wherein:
the first game code includes one or more second commands for a second API, and
the second API is different from the first API;
executing, by the one or more processors, the first game code;
providing an emulation layer that is configured to convert commands for the second API into commands for the first API;
converting, using the emulation layer, the one or more second commands for the second API into one or more third commands for the first API;
sending the one or more third commands to the graphics context using the context information and the first API, wherein the one or more third commands are configured to modify the graphics context to include data defining one or more second graphics objects representing gaming content; and
causing graphical output to be rendered to at least one display device of one or more display devices according to the one or more first graphics objects and the one or more second graphics objects included in the graphics context, thereby producing blended computer graphics from the game host engine and the first game application using the graphics context.

9. The method of claim 8, further comprising:
providing, using the one or more processors, a marketplace application that, when executed by the one or more processors, (a) causes the one or more processors to cause information to be retrieved via a network connection regarding a plurality of applications that are downloadable to one or more storage devices accessible to the one or more processors and (b) causes one or more selected applications from the plurality of applications to be downloaded to the one or more storage devices accessible to the one or more processors and installed on the one or more storage devices accessible to the one or more processors responsive to one or more inputs, wherein:
the game host engine is associated with information stored on the one or more storage devices accessible to the one or more processors indicating that the game host engine was installed on the one or more storage devices accessible to the one or more processors by the marketplace application, and
the first game code is not associated with information stored on the one or more storage devices accessible to the one or more processors indicating that the first game code was installed on the one or more storage devices accessible to the one or more processors by the marketplace application.

10. The method of claim 9, wherein:
the marketplace application is associated with a set of one or more first Internet addresses which are configured to provide the marketplace application with any of the applications of the plurality of applications responsive to one or more requests by the marketplace application, and
the one or more storage devices further store computer-executable instructions for controlling the one or more processors to obtain the first game code by downloading the first game code from an Internet address that is not in the set of one or more first Internet addresses.

11. The method of claim 8, wherein the second API is WebGL™ and the first API is not WebGL™.

12. The method of claim 8, wherein:
the game host engine is executed within a first operating system,
the first game code is in an interpreted programming language, and
the method further comprises causing a language interpreter for the interpreted programming language to be executed,
the language interpreter is configured to interpret and execute the first game code,
the language interpreter includes a first set of computer-executable instructions that govern interpretation of a first set of one or more commands of the interpreted programming language and a second set of computer-executable instructions that govern interpretation of the first set of one or more commands of the interpreted programming language,
the first set of computer-executable instructions is different from the second set of computer-executable instructions, and
the method additionally further comprises:
selecting, based on the first operating system, the first set of computer-executable instructions or the second set of computer-executable instructions to use as a selected set of computer-executable instructions, and
executing the first game code via the language interpreter using, at least in part, the selected set of computer-executable instructions.

13. The method of claim 12, wherein:
the language interpreter includes a common set of computer-executable instructions that govern interpretation of a second set of one or more commands of the interpreted programming language,
the first set of one or more commands and the second set of one or more commands do not overlap, and
the method further comprises:
executing the first game code via the language interpreter using the selected set of computer-executable instructions and the common set of computer-executable instructions.

14. A computer-readable, non-transitory medium storing one or more computer-executable instructions for controlling one or more processors of an electronic gaming machine having one or more display devices, wherein the computer-executable instructions stored on the computer-readable, non-transitory medium are configured to, when executed by the one or more processors, control the one or more processors to cause the one or more processors to:
provide a game host engine, the game host engine configured to cause the one or more processors to:
cause a graphics context for a first application programming interface (API) to be created in the one or more memory devices,
obtain context information that identifies the graphics context, and
send one or more first commands to the graphics context using the context information and the first API, wherein the one or more first commands are configured to modify the graphics context to include data defining one or more first graphics objects defining lobby content;
obtain first game code representing a first game application, wherein:
the first game code includes one or more second commands for a second API, and
the second API is different from the first API;
execute the first game code;
provide an emulation layer that is configured to convert commands for the second API into commands for the first API;
convert, using the emulation layer, the one or more second commands for the second API into one or more third commands for the first API;
send the one or more third commands to the graphics context using the context information and the first API, wherein the one or more third commands are configured to modify the graphics context to include data defining one or more second graphics objects representing gaming content; and
cause graphical output to be rendered to at least one of the one or more display devices according to the one or more first graphics objects and the one or more second graphics objects included in the graphics context, thereby producing blended computer graphics from the game host engine and the first game application using the graphics context.

15. The computer-readable, non-transitory medium of claim 14, wherein the computer-readable, non-transitory medium further stores additional computer-executable instructions configured to, when executed by the one or more processors, control the one or more processors to provide a marketplace application that, when executed by the one or more processors, (a) causes the one or more processors to cause information to be retrieved via a network connection regarding a plurality of applications that are downloadable to one or more storage devices accessible to the one or more processors and (b) causes one or more selected applications from the plurality of applications to be downloaded to the one or more storage devices accessible to the one or more processors and installed on the one or more storage devices responsive to one or more inputs,
the game host engine is associated with information stored on the one or more storage devices accessible to the one or more processors indicating that the game host engine was installed on the one or more storage devices by the marketplace application, and
the first game code is not associated with information stored on the one or more storage devices accessible to the one or more processors indicating that the first game code was installed on the one or more storage devices by the marketplace application.

16. The computer-readable, non-transitory medium of claim 15, wherein:
the marketplace application is associated with a set of one or more first Internet addresses which are configured to provide the marketplace application with any of the applications of the plurality of applications responsive to one or more requests by the marketplace application, and wherein the computer-readable, non-transitory medium further stores additional computer-executable instructions configured to, when executed by the one or more processors, control the one or more processors to obtain the first game code by downloading the first game code from an Internet address that is not in the set of one or more first Internet addresses.

17. The computer-readable, non-transitory medium of claim 14, wherein the second API is WebGL™ and the first API is not WebGL™.

18. The computer-readable, non-transitory medium of claim 14, wherein:

the game host engine is configured to be executable within a first operating system, the first game code is in an interpreted programming language, the computer-readable, non-transitory medium further stores additional computer-executable instructions configured to, when executed by the one or more processors, control the one or more processors to cause a language interpreter for the interpreted programming language to be executed, the language interpreter is configured to interpret and execute the first game code, the language interpreter includes a first set of computer-executable instructions that govern interpretation of a first set of one or more commands of the interpreted programming language and a second set of computer-executable instructions that govern interpretation of the first set of one or more commands of the interpreted programming language, the first set of computer-executable instructions is different from the second set of computer-executable instructions, and the computer-readable, non-transitory medium further stores additional computer-executable instructions configured to, when executed by the one or more processors, control the one or more processors to:

select, based on the first operating system, the first set of computer-executable instructions or the second set of computer-executable instructions to use as a selected set of computer-executable instructions, and execute the first game code via the language interpreter using, at least in part, the selected set of computer-executable instructions.

19. The computer-readable, non-transitory medium of claim 18, wherein:

the language interpreter includes a common set of computer-executable instructions that govern interpretation of a second set of one or more commands of the interpreted programming language, the first set of one or more commands and the second set of one or more commands do not overlap, and the computer-readable, non-transitory medium further stores additional computer-executable instructions configured to, when executed by the one or more processors, control the one or more processors to execute the first game code via the language interpreter using the selected set of computer-executable instructions and the common set of computer-executable instructions.

20. The computer-readable, non-transitory medium of claim 18, wherein the computer-readable, non-transitory medium further stores additional computer-executable instructions configured to, when executed by the one or more processors, control the one or more processors to:

select the first set of computer-executable instructions as the selected set of computer-executable instructions when the operating system that the computer-executable instructions execute within is Android™, and select the second set of computer-executable instructions as the selected set of computer-executable instructions when the operating system that the computer-executable instructions execute within is iOS®.

* * * * *